United States Patent
Hayashi et al.

(10) Patent No.: US 10,734,634 B2
(45) Date of Patent: Aug. 4, 2020

(54) POSITIVE ELECTRODE FOR ALL-SOLID SECONDARY BATTERY, METHOD FOR MANUFACTURING SAME, AND ALL-SOLID SECONDARY BATTERY

(71) Applicant: JAPAN SCIENCE AND TECHNOLOGY AGENCY, Kawaguchi-shi, Saitama (JP)

(72) Inventors: Akitoshi Hayashi, Sakai (JP); Masahiro Tatsumisago, Sakai (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 165 days.

(21) Appl. No.: 15/520,045

(22) PCT Filed: Oct. 20, 2015

(86) PCT No.: PCT/JP2015/079589
§ 371 (c)(1),
(2) Date: Apr. 18, 2017

(87) PCT Pub. No.: WO2016/063877
PCT Pub. Date: Apr. 28, 2016

(65) Prior Publication Data
US 2017/0317337 A1    Nov. 2, 2017

(30) Foreign Application Priority Data

Oct. 22, 2014  (JP) ................................ 2014-215393

(51) Int. Cl.
| | |
|---|---|
| H01M 4/1315 | (2010.01) |
| H01M 4/36 | (2006.01) |
| H01M 4/1397 | (2010.01) |
| C01B 17/22 | (2006.01) |
| H01M 4/58 | (2010.01) |
| H01M 4/04 | (2006.01) |
| H01M 4/136 | (2010.01) |
| C01D 13/00 | (2006.01) |
| C01D 15/00 | (2006.01) |
| H01M 10/0525 | (2010.01) |
| H01M 10/0562 | (2010.01) |
| H01M 4/62 | (2006.01) |
| H01M 10/052 | (2010.01) |

(52) U.S. Cl.
CPC ........... *H01M 4/1315* (2013.01); *C01B 17/22* (2013.01); *C01D 13/00* (2013.01); *C01D 15/00* (2013.01); *H01M 4/04* (2013.01); *H01M 4/136* (2013.01); *H01M 4/1397* (2013.01); *H01M 4/364* (2013.01); *H01M 4/5815* (2013.01); *H01M 10/0525* (2013.01); *C01P 2002/50* (2013.01); *C01P 2002/72* (2013.01); *C01P 2002/77* (2013.01); *C01P 2006/40* (2013.01); *H01M 4/625* (2013.01); *H01M 10/052* (2013.01); *H01M 10/0562* (2013.01)

(58) Field of Classification Search
CPC .. H01M 4/1315; H01M 10/0525; H01M 4/04; H01M 4/136; H01M 4/1397; H01M 4/364; H01M 4/5815; H01M 4/625; H01M 10/052; H01M 10/0562; C01D 13/00; C01D 15/00; C01B 17/22
See application file for complete search history.

(56) References Cited

U.S. PATENT DOCUMENTS

| | | | |
|---|---|---|---|
| 6,187,479 B1* | 2/2001 | Liu | ................... H01M 10/0563 429/217 |
| 2011/0171537 A1* | 7/2011 | Takeuchi | ................ C01B 17/22 429/322 |
| 2014/0023903 A1* | 1/2014 | Lu | ....................... H01M 10/399 429/103 |
| 2014/0054492 A1 | 2/2014 | Mukai et al. | |
| 2014/0127575 A1* | 5/2014 | Scrosati | ................ H01M 4/366 429/213 |
| 2014/0154585 A1* | 6/2014 | Hayashi | .............. H01M 4/5815 429/319 |
| 2014/0255787 A1 | 9/2014 | Passerini et al. | |
| 2014/0272554 A1* | 9/2014 | Yanagi | .............. H01M 10/0562 429/189 |
| 2015/0024280 A1 | 1/2015 | Uchiyama | |

FOREIGN PATENT DOCUMENTS

| | | |
|---|---|---|
| JP | 2008-103282 A | 5/2008 |
| JP | 2013-229227 A | 11/2013 |
| JP | 2014-28717 A | 2/2014 |
| WO | 2012/117638 A1 | 9/2012 |
| WO | 2012-160707 A1 | 11/2012 |

OTHER PUBLICATIONS

Abstracts of Annual Meeting of the 53th Battery Symposium in Japan, 2012, p. 555. (See: Background Art section of Application.).
Takashi Hakari, et al., "3E19 Preparation of lithium sulfide-lithium halide materials by mechanical milling and their application to all-solid-state batteries," Abstracts of Annual Meeting of the 55th Battery Symposium in Japan, Nov. 19, 2014, p. 417. (See International Search Report and English abstract.).
Takashi Hakari, et al., "Preparation and conductivity of Li2S-LiX(X= Cl, Br, I) positive electrode for all-solid-state lithium secondary batteries," Abstracts of the 55th Annual Meeting of the Ceramic Society of Japan, Mar. 6, 2015, p. 3E02. (See International Search Report and English abstract.).

(Continued)

*Primary Examiner* — Gregg Cantelmo
(74) *Attorney, Agent, or Firm* — Stites & Harbison, PLLC; Terry L. Wright; Jeffrey A. Haeberlin (57) ABSTRACT

A positive electrode for an all-solid secondary battery, comprising a positive electrode active material expressed by $A_2S \cdot AX$, wherein
A is an alkali metal; and
X is selected from I, Br, Cl, F, $BF_4$, $BH_4$, $SO_4$, $BO_3$, $PO_4$, O, Se, N, P, As, Sb, $PF_6$, $AsF_6$, $ClO_4$, $NO_3$, $CO_3$, $CF_3SO_3$, $CF_3COO$, $N(SO_2F)_2$ and $N(CF_3SO_2)_2$.

10 Claims, 10 Drawing Sheets

(56) References Cited

OTHER PUBLICATIONS

Japan Patent Office, International Search Report issued in corresponding Application No. PCT/JP2015/079589, dated Jan. 19, 2016.

* cited by examiner

Fig. 14

POSITIVE ELECTRODE FOR ALL-SOLID SECONDARY BATTERY, METHOD FOR MANUFACTURING SAME, AND ALL-SOLID SECONDARY BATTERY

TECHNICAL FIELD

The present invention relates to a positive electrode for an all-solid secondary battery, a method for manufacturing the same, and the all-solid secondary battery. More particularly, the present invention relates to the positive electrode for the all-solid secondary battery having a high charge-discharge capacity, the method for manufacturing the same, and the all-solid secondary battery.

BACKGROUND ART

Lithium secondary batteries have high voltage and high capacity, and thus have been widely used as power supplies of mobile phones, digital cameras, camcorders, notebook computers, electric vehicles, and so on. The lithium secondary batteries, which are commonly circulated, use a liquid electrolyte in which an electrolytic salt as an electrolyte is dissolved in a non-aqueous solvent. Since many of non-aqueous solvents are flammable, there have been demands to secure safety of the lithium secondary batteries.

For the purpose of securing safety, all-solid lithium secondary batteries have been proposed that use, instead of the non-aqueous solvent, a so-called solid electrolyte made of solid materials. A positive electrode of the battery contains various components, such as a positive electrode active material, an electrical conducting material, and the electrolyte. Among these components, $Li_2S$ used as the positive electrode active material is drawing attention because of its high theoretical capacity.

$Li_2S$ itself is too low in ionic conductivity to be used as the positive electrode active material, and thereby needs to be used with the conductive component. Therefore, the inventors of the present invention had proposed a positive electrode containing $Li_2S$, acetylene black as an electrical conducting material, and $Li_2S.P_2S_5$ as a solid electrolyte (*Abstracts of Presentations at the 53rd Symposium on Batteries in Japan.* 2012. p. 555: Non-Patent Literature 1).

CITATION LIST

Non-Patent Literature

Non-Patent Literature 1: *Abstracts of Presentations at the Symposium on Batteries in Japan.* 2012. p. 555.

SUMMARY OF INVENTION

Technical Problems

The positive electrode of the above-mentioned Non-Patent Literature 1 contains $Li_2S$, acetylene black, and $Li_2S.P_2S_5$ at a ratio by weight of 25:25:50. A battery using this positive electrode seemed to have a high charge-discharge capacity to a certain extent. It had been, however, desired that $Li_2S$ as the positive electrode active material should be contained in the positive electrode as high proportion as possible from the viewpoint of improving the charge-discharge capacity.

Solution to Problems

As a result of earnest investigations on the constitutive components of the positive electrode in order to further improve the charge-discharge capacity of the secondary battery, the inventors of the present invention found that $Li_2S$ complexed with a lithium salt, which is normally used as a supporting electrolyte in an organic electrolytic solution in a lithium-ion secondary battery, is capable of improving a charge-discharge capacity without lowering ionic conductivity, even if a proportion of $Li_2S$ is increased in the positive electrode. The inventors of the present invention also found that the same improvement tendency applies to $Na_2S$ complexed with a sodium salt.

The present invention thus provides a positive electrode for an all-solid secondary battery, comprising a positive electrode active material expressed by $A_2S.AX$, wherein A is an alkali metal; and X is selected from I, Br, Cl, $BF_4$, $BH_4$, $SO_4$, $BO_3$, $PO_4$, O, Se, N, P, As, Sb, $PF_6$, $AsF_6$, $ClO_4$, $NO_3$, $CO_3$, $CF_3SO_3$, $CF_3COO$, $N(SO_2F)_2$ and $N(CF_3SO_2)_2$.

The present invention also provides a method for manufacturing the above-described positive electrode for the all-solid secondary battery, comprising subjecting $A_2S$ and AX to mechanical milling treatment in order to obtain $A_2S.AX$.

The present invention also provides an all-solid secondary battery comprising the above-described positive electrode and a solid electrolyte layer expressed by $A_2S.M_xS_y$, wherein A is the same as the one described above; M is selected from P, Si, Ge, B, Al and Ga; and x and y are an integer, and x and y indicate a stoichiometric ratio varying depending upon the type of M.

Advantageous Effects of Invention

The present invention can provide the positive electrode for the all-solid secondary battery having the high charge-discharge capacity, the method for manufacturing the same, and the all-solid secondary battery including the positive electrode.

The present invention can also provide the positive electrode for the all-solid secondary battery having a higher charge-discharge capacity, wherein the alkali metal is Li or Na, in the case where A is Li, AX is selected from LiI, LiBr, LiCl, LiF, $LiBF_4$, $LiBH_4$, $Li_2SO_4$, $Li_3BO_3$, $Li_3PO_4$, $Li_2O$, $Li_2Se$, $Li_3N$, $Li_3P$, $Li_3As$, $Li_3Sb$, $LiPF_6$, $LiAsF_6$, $LiClO_4$, $LiNO_3$, $Li_2CO_3$, $LiCF_3SO_3$, $LiCF_3COO$, $LiN(SO_2F)_2$ and $LiN(CF_3SO_2)_2$; and in the case where A is Na, AX is selected from NaI, NaBr, NaCl, NaF, $NaBF_4$, $NaBH_4$, $Na_2SO_4$, $Na_3BO_3$, $Na_3PO_4$, $Na_2O$, $Na_2Se$, $Na_3N$, $Na_3P$, $Na_3As$, $Na_3Sb$, $NaPF_6$, $NaAsF_6$, $NaClO_4$, $NaNO_3$, $Na_2CO_3$, $NaCF_3SO_3$, $NaCF_3COO$, $NaN(SO_2F)_2$ and $NaN(CF_3SO_2)_2$.

The present invention can also provide the positive electrode for the all-solid secondary battery having a higher charge-discharge capacity, in a case where $A_2S$ and AX in $A_2S.AX$ have a ratio (molar ratio) of 99:1 to 20:80.

The present invention can also provide the positive electrode for the all-solid secondary battery having a higher charge-discharge capacity, in a case where an electrical conducting material comprising a carbon material is contained within 0.1 to 50 parts by weight with respect to 100 parts by weight of the positive electrode active material.

The present invention can also provide the positive electrode for the all-solid secondary battery having a higher charge-discharge capacity, in a case where the all-solid secondary battery is a layered product including the positive electrode, a solid electrolyte layer, and a negative electrode; the solid electrolyte layer contains an electrolyte expressed by $A_2S.M_xS_y$, wherein A is the same as the one described above; M is selected from P, Si, Ge, B, Al and Ga; and x and y are an integer, and x and y indicate a stoichiometric ratio varying depending upon the type of M; and the positive electrode is free of the electrolyte.

The present invention can also provide the method for manufacturing the positive electrode for the all-solid secondary battery having a higher charge-discharge capacity, in a case where the mechanical milling treatment is carried out by using a planetary ball mill under the following conditions: a rotation speed of 50 to 700 rpm, a treating time of 0.1 to 30 hours, and an electric power for the treatment of 1 to 100 kWh/kg (total amount of $A_2S$ and AX).

The present invention can also provide the method for manufacturing the positive electrode for the all-solid secondary battery having a higher charge-discharge capacity, in a case where the positive electrode contains an electrical conducting material comprising a carbon material, and the positive electrode is obtained by subjecting $A_2S.AX$ and the electrical conducting material to the mechanical milling treatment.

DESCRIPTION OF EMBODIMENTS (1) Positive Electrode for All-Solid Secondary Battery The positive electrode for the all-solid secondary battery contains $A_2S.AX$ as the positive electrode active material. In this specification, $A_2S.AX$ means a composite of $A_2S$ and AX that are unlikely to be isolated from each other.

Positive Electrode Active Material

In $A_2S.AX$ as the positive electrode active material, A is the alkali metal, and more specifically, A is Li or Na. In the case where A is Li, the all-solid secondary battery means an all-solid lithium secondary battery; and in the case where A is Na, the all-solid secondary battery means an all-solid sodium secondary battery.

X may be selected from I, Br, Cl, F, $BF_4$, $BH_4$, $SO_4$, $BO_3$, $PO_4$, O, Se, N, P, As, Sb, $PF_6$, $AsF_6$, $ClO_4$, $NO_3$, $CO_3$, $CF_3SO_3$, $CF_3COO$, $N(SO_2F)_2$ and $N(CF_3SO_2)_2$.

In the case where A is Li, AX may be selected from LiI, LiBr, LiCl, LiF, $LiBF_4$, $LiBH_4$, $Li_2SO_4$, $Li_3BO_3$, $Li_3PO_4$, $Li_2O$, $Li_2Se$, $Li_3N$, $Li_3P$, $Li_3As$, $Li_3Sb$, $LiPF_6$, $LiAsF_6$, $LiClO_4$, $LiNO_3$, $Li_2CO_3$, $LiCF_3SO_3$, $LiCF_3COO$, $LiN(SO_2F)_2$ and $LiN(CF_3SO_2)_2$; and in the case where A is Na, AX may be selected from NaI, NaBr, NaCl, NaF, $NaBF_4$, $NaBH_4$, $Na_2SO_4$, $Na_3BO_3$, $Na_3PO_4$, $Na_2O$, $Na_2Se$, $Na_3N$, $Na_3P$, $Na_3As$, $Na_3Sb$, $NaPF_6$, $NaAsF_6$, $NaClO_4$, $NaNO_3$, $Na_2CO_3$, $NaCF_3SO_3$, $NaCF_3COO$, $NaN(SO_2F)_2$ and $NaN(CF_3SO_2)_2$. Also, AX may be selected from one of the above-listed exemplifications or from two or more of the above-listed exemplifications.

In the case where A is Li, the above-described AX is preferably $LiBF_4$, LiBr, LiI, LiCl, or $LiBH_4$; and in the case where A is Na, AX is preferably $NaBF_4$, NaBr, NaI, NaCl or $NaBH_4$.

$A_2S$ and AX in $A_2S.AX$ preferably have the ratio (molar ratio) of 99:1 to 20:80. In a case where the molar ratio of $A_2S$ is higher than 99, an ionic conductivity becomes lower, possibly leading to a function of the positive electrode. In a case where the molar ratio of $A_2S$ is lower than 20, the secondary battery may be unlikely to improve its charge-discharge capacity. A more preferred ratio is 40:60 to 95:5, a further preferred ratio is 50:50 to 90:10, and a particularly preferred ratio is 60:40 to 80:20. In this invention, in the case where AX is selected from two or more of the above-listed exemplifications, and as long as all of the two or more AX's are contained in the positive electrode active material, a content ratio of the two or more AX's is not particularly limited. (In this specification, the wording "noun's" means the plural of noun.) In the case where AX is LiBr or LiI, a molar ratio of the constitutive components is desirably 25:75 to 75:25 from the viewpoint of improving the charge-discharge capacity of the secondary battery.

Electrical Conducting Material

The positive electrode may contain the electrical conducting material. Used as the electrical conducting material is not particularly limited; and the electrical conducting material may be the carbon material, which has been used as an electrical conducting material in a field of secondary batteries, such as carbon black, e.g. acetylene black (AB), Denka black, or Ketjen black, carbon nanotube, natural graphite, artificial graphite, or vapor-grown carbon fiber (VGCF).

The electrical conducting material accounts preferably for 0.1 to 50 parts by weight with respect to 100 parts by weight of the positive electrode active material. In a case where the electrical conducting material accounts for lower than 0.1 parts by weight of the positive electrode, an amount of electrons transferable to the positive electrode becomes lower, possibly leading to the insufficient charge-discharge capacity. In a case where the electrical conducting material accounts for higher than 50 parts by weight of the positive electrode, an amount of the positive electrode active material becomes relatively lower in the positive electrode, possibly leading to a lowering of the charge-discharge capacity. A more preferred amount of the electrical conducting material is 10 to 30 parts by weight.

Other Components

The positive electrode may contain components besides the positive electrode active material and the electrical conducting material, which are normally used in all-solid secondary batteries. Examples of the other components include active materials, such as $LiCoO_2$ and $LiMn_2O_4$. These active materials may be covered with a coat of oxide or sulfide. Examples of how the coat is formed include the following: immersing an active material in a precursor solution, which is to be a coat, and then subjecting the active material to heat treatment; and spraying a precursor solution, which is to be a coat, on an active material, and then subjecting the active material to heat treatment.

The positive electrode may also contain a binder. Examples of the binder include polyvinylidene fluoride, polytetrafluoroethylene, polyvinyl acetate, polymethyl methacrylate and polyethylene.

It is desirable that the positive electrode should not contain $A_2S.M_xS_y$ (A is the same as the one described above; M is selected from P, Si, Ge, B, Al and Ga; and x and y are an integer; and x and y indicate a stoichiometric ratio varying depending upon the type of M), which is normally contained as an electrolyte in a solid electrolyte layer of all-solid secondary batteries, from the viewpoint of improving the charge-discharge capacity per gross weight of the positive electrode. Specific examples of $M_xS_y$ include $P_2S_5$, $SiS_2$, $GeS_2$, $B_2S_3$, $Al_2S_3$ and $Ga_2S_3$. In the case where A is Li, $A_2S.M_xS_y$ means, for example, $Li_2S.P_2S_5$. The all-solid secondary battery is formed of the layered product including the positive electrode, the solid electrolyte layer, and the negative electrode, wherein the solid electrolyte layer contains as the electrolyte $A_2S.M_xS_y$ (A is the same as the one described above; M is selected from P, Si, Ge, B, Al and Ga; and x and y are an integer, and x and y indicate a stoichiometric ratio varying depending upon the type of M) and wherein the positive electrode is free of the above-described electrolyte.

(2) Method for Manufacturing Positive Electrode

The method for manufacturing the positive electrode comprises subjecting $A_2S$ and AX to the mechanical milling treatment in order to obtain $A_2S.AX$.

Used as materials for $A_2S$ and AX are not particularly limited; and any commercially available materials may be used. It is desirable that the materials to be used for $A_2S$ and AX should be as high in purity as possible. There is no particular limitation on shape of $A_2S$ and AX; and $A_2S$ and AX may come in various shapes, such as granular and clumped.

A treatment instrument to be used for the mechanical milling treatment and treatment conditions to be set for the mechanical milling treatment are not particularly limited, as long as the materials can be mixed thoroughly.

Used as the treatment instrument is normally a ball mill. Ball mills are desirable because high mechanical energy is obtainable from them. Among the ball mills, a planetary ball mill is preferred because the planetary ball mill can efficiently generate high impact energy due to rotation of a pot as well as revolution of a stand plate.

The treatment conditions may be appropriately determined depending upon the treatment instrument to be used for the mechanical milling treatment. For example, in the case where a ball mill is used, the higher a rotation speed is and/or the longer a treating time is, the more uniformly the materials can be mixed and the more reactive the materials can be. To be more specific, in the case where the planetary ball mill is used, as examples of the treatment conditions there may be mentioned a rotation speed of 50 to 700 rpm, a treating time of 0.1 to 30 hours, and an electric power of 1 to 100 kWh/kg (total amount of $A_2S$ and AX). More is preferred treating conditions are a rotation speed of 200 to 600 rpm, a treating time of 1 to 20 hours, and an electric power of 6 to 50 kWh/kg (total amount of $A_2S$ and AX).

The mechanical milling treatment may be either dry type or wet type.

In the case where the positive electrode is to contain the electrical conducting material and other components, the electrical conducting material and the other components may be contained, for example, in the following manner:

(a) a method for subjecting a mixture of $A_2S$, AX, the electrical conducting material, and the other components to mechanical milling treatment, or (b) a method for subjecting $A_2S$ and AX to mechanical milling treatment, and then subjecting a mixture of $A_2S.AX$, the electrical conducting material, and the other components to mechanical milling treatment.

The mixed materials may be subjected to, for example, press forming in order to obtain the positive electrode in the form of pellets (formed product). In this case, the positive electrode may be formed on a current collector in the form of a metal plate made of aluminum, copper, or the like.

(3) All-Solid Secondary Battery

The all-solid secondary battery is provided with the above-described positive electrode, an electrolyte layer, and an negative electrode. The all-solid secondary battery can be obtained, for example, by layering and pressing the positive electrode, the electrolyte layer, and the negative electrode.

Electrolyte Layer

The electrolyte to be contained in the electrolyte layer is not particularly limited, and any electrolyte that is normally used for all-solid secondary batteries may be used. For example, the electrolyte may be expressed by $A_2S.M_xS_y$ (wherein A is the same as the one described above; M is selected from P, Si, Ge, B, Al and Ga; and x and y are an integer, and x and y indicate a stoichiometric ratio varying depending upon the type of M).

$A_2S$ is either $Li_2S$ or $Na_2S$.

To form $M_xS_y$, M is selected from P, Si, Ge, B, Al and Ga; and x and y are an integer, and x and y indicate a stoichiometric ratio varying depending upon the type of M. Each of the six elements as M may have any applicable valences, and x and y may be determined depending upon the valences of M. For example, P may be trivalent or pentavalent; Si may be tetravalent; Ge may be divalent or tetravalent; B may be trivalent; Al may be trivalent; and Ga may be trivalent. Specific examples of $M_xS_y$ include $P_2S_5$, $SiS_2$, $GeS_2$, $B_2S_3$, $Al_2S_3$ and $Ga_2S_3$. These specific $M_xS_y$'s may be used independently, or two or more kinds may be used in combination. (In this specification, the wording " . . . 's" means the plural of . . . ) Of these $M_xS_y$'s, $P_2S_5$ is particularly preferable.

A molar ratio between $A_2S$ and $M_xS_y$ is preferably 50:50 to 90:10; more preferably 67:33 to 80:20; and further preferably 70:30 to 80:20.

Examples of the electrolyte include LiI, $Li_3PO_4$, NaI and $Na_3PO_4$ besides $A_2S.M_xS_y$.

$A_2S.M_xS_y$ accounts preferably for 90% by weight or higher of the electrolyte layer, and $A_2S.M_xS_y$ more preferably accounts for the entire electrolyte layer. The electrolyte layer is preferably 5 to 500 μm in thickness, more preferably 20 to 100 μm. The electrolyte layer may be in the form of pellets by, for example, being pressed.

Negative Electrode

The negative electrode to be contained in the all-solid secondary battery is not particularly limited, and any negative electrode that is normally used for all-solid secondary batteries may be used. The negative electrode may be made of a negative electrode active material only, or may be made of the negative electrode active material mixed with a binder, an electrical conducting material, an electrolyte, etc.

Examples of the negative electrode active material include metals, such as In and Sn; alloys thereof; graphite; hard carbon; and various transition metal oxides, such as SnO and $TiO_2$. The negative electrode active material may also contain Li, Na, or an Li-containing or Na-containing material, such as $Li_{4/3}Ti_{5/3}O_4$, $Na_2Ti_3O_7$ or $Na_{15}Sn_4$.

Examples of the binder include polyvinylidene fluoride, polytetrafluoroethylene, polyvinyl acetate, polymethyl methacrylate and polyethylene.

Examples of the electrical conducting material include natural graphite, artificial graphite, AB, VGCF, carbon nanotube and activated carbon.

The electrolyte to be contained in the negative electrode may be the same as the electrolyte to be contained in the electrolyte layer.

The negative electrode active material, or a mixture made of the negative electrode active material optionally with the binder, the electrical conducting material, the electrolyte is pressed in order to obtain the negative electrode in the form of pellets. Also, in a case where a metal sheet (foil) made of metal or an alloy thereof is used as the negative electrode active material, the sheet may be used as it is.

The negative electrode may be formed on a current collector made of aluminum, copper, or the like.

EXAMPLES

Hereinafter the present invention will be further described for more detail through the use of Examples; however, the present invention should not be limited only to these Examples.

Example 1

$Li_2S$ (manufactured by Idemitsu Kosan Co., Ltd. and having a purity of 99.9% or higher), LiBr (manufactured by Sigma-Aldrich Co. LCC and having a purity of 99.9%), and LiI (manufactured by Sigma-Aldrich Co. LCC and having a purity of 99.9%) were weighed to be 0.3 g in total at molar ratio of 50:25:25. The weighed material was subjected to mechanical milling treatment, and $50Li_2S.50(0.5LiBr.0.5LiI)$ was obtained. Used as a treatment instrument was Pulverisette P-7 manufactured by Fritsch GmbH, which is a planetary ball mill with a pot and balls. The pot and the balls, both made of zirconium oxide, were used; and the one hundred sixty (160) balls were used in the 45-milliliter pot, each of the balls having a diameter of 4 mm. The treatment was carried out at room temperature (about 25° C.) and at a rotation speed of 510 rpm for 10 hours.

Figure 1:
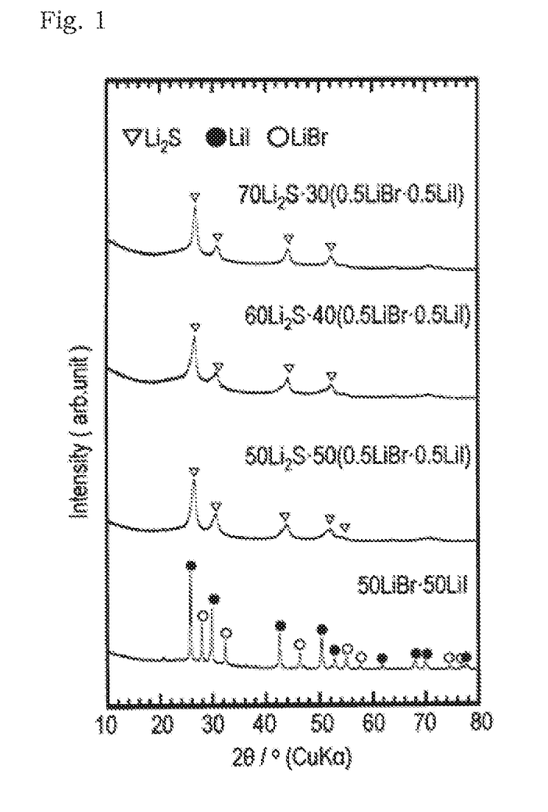
FIG. 1 indicates XRD patterns of a positive electrode of Example 1.

10 mg of the obtained $50Li_2S.50(0.5LiBr.0.5LiI)$ was pressed (pressure of 360 MPa) to obtain a pellet (positive electrode), the pellet having a diameter of 10 mm and a thickness of about 0.05 mm. FIG. 1 indicates an XRD pattern of $50Li_2S.50(0.5LiBr.0.5LiI)$. FIG. 1 indicates at its lower part an XRD pattern of $0.5LiBr.0.5LiI$ obtained by the mechanical milling treatment. In FIG. 1, a symbol ● indicates a peak corresponding to LiI, a symbol ○ indicates a peak corresponding to LiBr, and a symbol ∇ indicates a peak corresponding to $Li_2S$.

Figure 2:
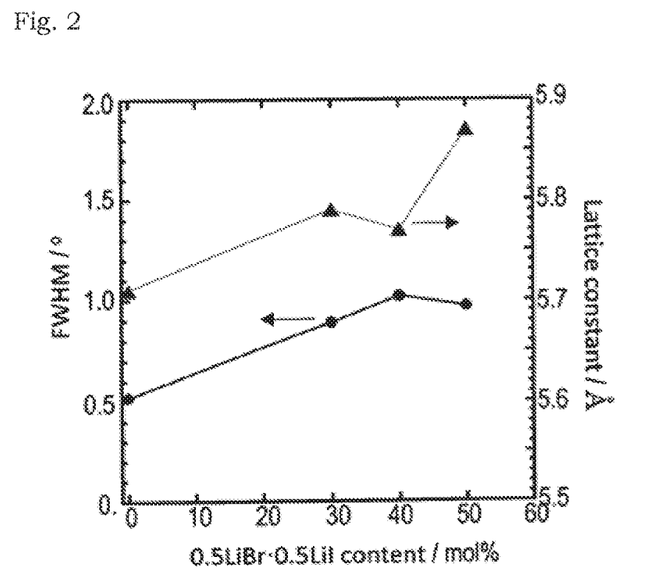
FIG. 2 indicates a graph indicating a relation between a half-value width of the positive electrode of Example 1 and a 0.5LiBr.0.5LiI content in the positive electrode, and a relation between a lattice constant of the positive electrode and the 0.5LiBr.0.5LiI content in the positive electrode.

Pellets (positive electrode) of $10Li_2S.90(0.5LiBr.0.5LiI)$, of $60Li_2S.40(0.5LiBr.0.5LiI)$, of $70Li_2S.30(0.5LiBr.0.5LiI)$, and of $80Li_2S.20(0.5LiBr.0.5LiI)$ were obtained in the same manner as described above, except that a molar ratio of $Li_2S$, LiBr and LiI was changed. XRD patterns were measured in the same manner as described above, and results thereby obtained are indicated in FIGS. 1 and 2.

It is found from FIG. 1 that $Li_2S.(0.5LiBr.0.5LiI)$'s do not: exhibit any LiBr-derived peaks and LiI-derived peaks, regardless of the molar ratio between $Li_2S$ and $(0.5LiBr.0.5LiI)$, but exhibit $Li_2S$-derived peaks only. FIG. 2 indicates full width at half maximum (FWHM) and lattice constants of peaks of a (111) surface of $Li_2S$'s in the XRD patterns of $Li_2S.(0.5LiBr.0.5LiI)$'s. FIG. 2 indicates that the FWHM and in the lattice constants are increased with an increase of content of $0.5LiBr.0.5LiI$. This leads to an inference such that LiBr.LiI was taken into the crystallized $Li_2S$ and became a solid solution therein.

Figure 3:
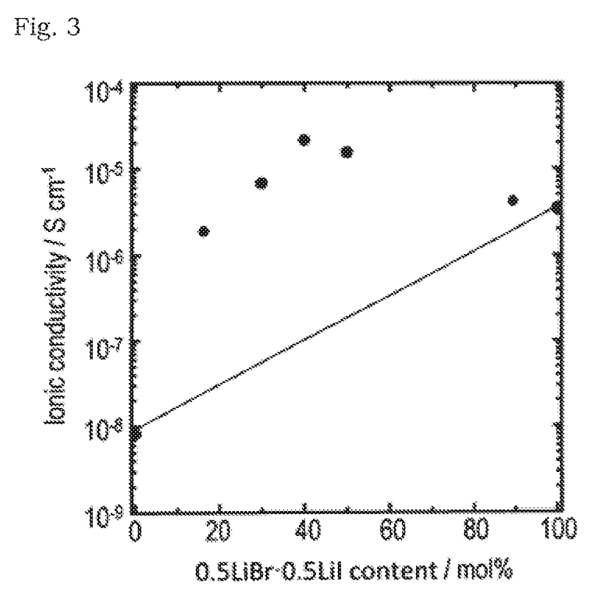
FIG. 3 indicates a graph indicating a relation between a conductivity of the positive electrode of Example 1 and the 0.5LiBr.0.5LiI content in the positive electrode.

FIG. 3 indicates conductivities of $Li_2S.(0.5LiBr.0.5LiI)$'s. FIG. 3 also indicates conductivities of $Li_2S$ itself and of $0.5LiBr.0.5LiI$ itself, both of which were obtained by the mechanical milling treatment. FIG. 3 indicates the following results: $0.5LiBr.0.5LiI$ itself is relatively high in conductivity, but is not expected to have a high charge-discharge capacity because of lack of $Li_2S$, whereas $Li_2S$ itself is extremely low in conductivity and thereby cannot sufficiently transfer lithium ions. It is thus expected that $Li_2S$ and LiBr.LiI combined may achieve both improvement in the conductivity and assuredness in the charge-discharge capacity.

Next, 0.27 g of $60Li_2S.40(0.5LiBr.0.5LiI)$ and 0.03 g of vapor-grown carbon fibers (manufactured by Showa Denko K.K. and hereinafter referred to as VGCF) were subjected to mechanical milling treatment. Used as a treatment instrument was the same as the one described above; a pot and balls, both made of zirconium oxide, were used; and the one hundred sixty (160) balls were used in the 45-milliliter pot, each of the balls having a diameter of 4 mm. The treatment was carried out at room temperature (about 25° C.) and at a rotation speed of 510 rpm for 10 hours.

10 mg of a composite of the treated $60Li_2S.40(0.5LiBr.0.5LiI)$ and VGCF was pressed (pressure of 360 MPa) to obtain a pellet (positive electrode), the pellet having a diameter of 10 mm and a thickness of about 0.05 mm.

A solid electrolyte containing $Li_2S.P_2S_5$ (hereinafter referred to as SE and having a molar ratio of 80:20 between $Li_2S$ and $P_2S_5$) was pressed (pressure of 360 MPa) to obtain a pellet (electrolyte layer containing SE), the pellet having a diameter of 10 mm and a thickness of about 0.7 mm. SE described above was synthesized in the following way.

$Li_2S$ (manufactured by Idemitsu Kosan Co., Ltd. and having a purity of 99.9% or higher) and $P_2S_5$ (manufactured by Sigma-Aldrich Co. LCC, and having a purity of 99%) were weighed to be 1 g in total at a molar ratio of 80:20, and were poured into a planetary ball mill. After being poured, $Li_2S$ and $P_2S_5$ were subjected to mechanical milling treatment in order to obtain SE. Used as the planetary ball mill was Pulverisette P-7 manufactured by Fritsch GmbH; a pot and balls, both made of zirconium oxide, were used; and the five hundred (500) balls were used in the 45-milliliter pot, each of the balls having a diameter of 4 mm. The dry mechanical milling treatment was carried out at a rotation speed of 510 rpm and at room temperature for 10 hours in a dry nitrogen-filled glove box. This synthesis method is based on the descriptions in the section titled "Experimental" in Akitoshi Hayashi, et al. *Journal of Non-Crystalline Solids*. 356. 2010. 2670-2673.

Used as a negative electrode was an indium foil having a thickness of 0.1 mm.

The above-described positive electrode and electrolyte layer were layered and interposed between stainless steel current collectors and were pressed (pressure of 360 MPa), and the negative electrode was inserted into the electrolyte layer side, and then the resulting product was pressed again (pressure of 120 MPa) to obtain an all-solid lithium secondary battery.

Figure 4:
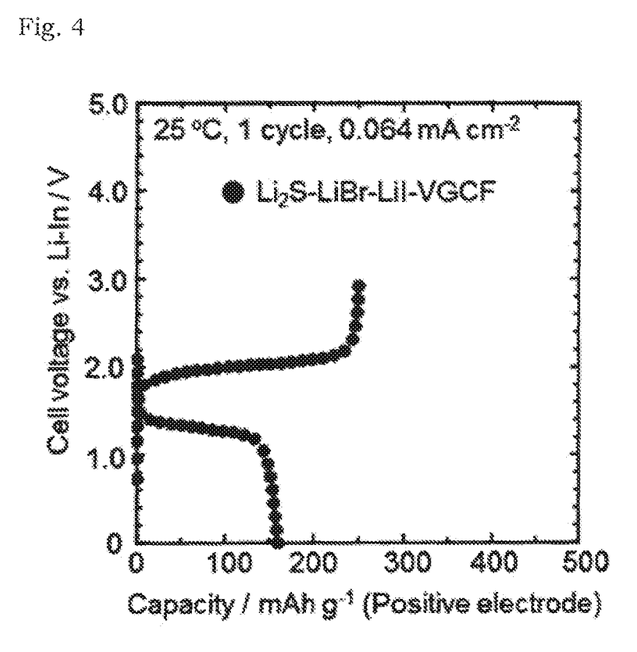
FIG. 4 indicates a graph indicating a relation between a cell potential and a charge-discharge capacity of a secondary battery of Example 1.

FIG. 4 indicates a relation between a cell potential and a charge-discharge capacity of the secondary battery (cell), in the case where the obtained secondary battery was subjected to one charge-discharge cycle at 25° C. and at a current density of 0.064 mA/cm². In FIG. 4, a vertical axis on the left side of a graph indicates a potential with respect to an Li.In counter electrode. It is found from FIG. 4 that a reversible capacity of over about 150 mAhg$^{-1}$ is obtained.

Example 2

Figure 5:
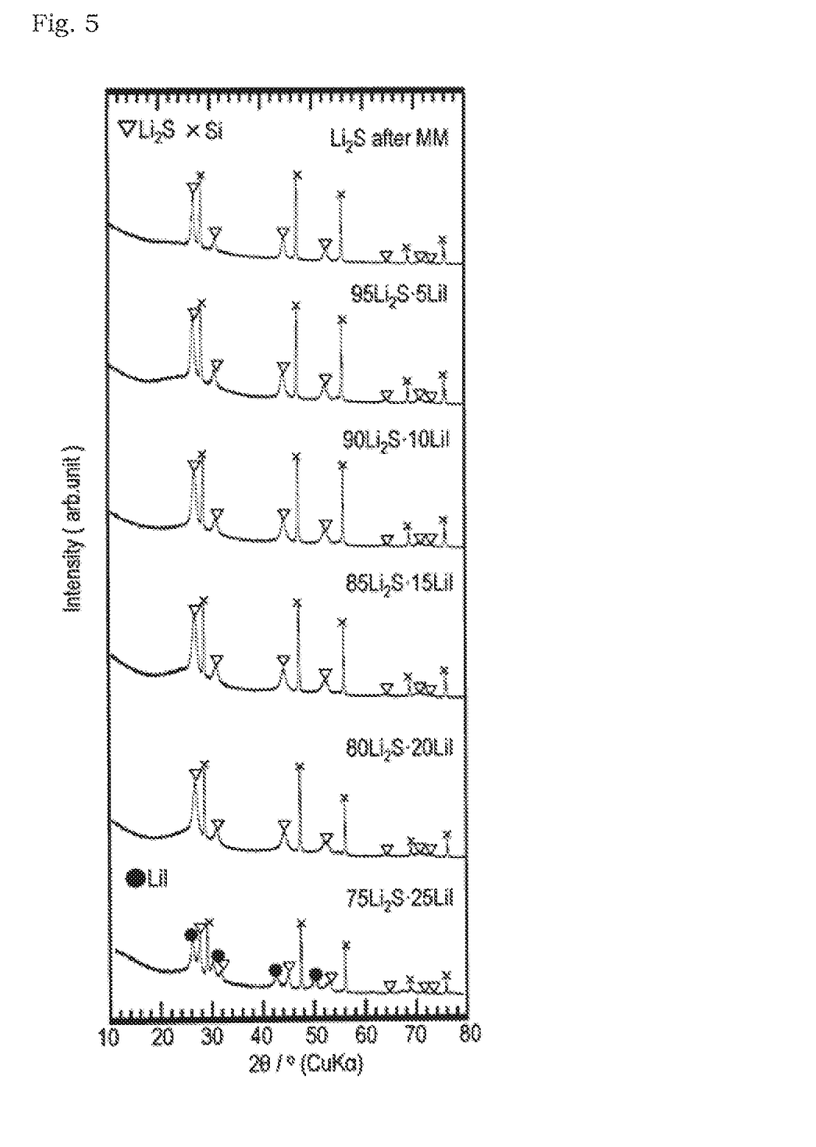
FIG. 5 indicates XRD patterns of a positive electrode of Example 2.

Various molar ratios of $Li_2S.LiI$'s were obtained in the same manner as in Example 1, except that only LiI was used instead of LiBr.LiI, FIG. 5 indicates XRD patterns of the obtained $Li_2S.LiI$'s. In FIG. 5, a symbol ● indicates a peak corresponding to LiI, a symbol ∇ indicates a peak corresponding to $Li_2S$, and a symbol × indicates a peak corresponding to Si, which was added as an internal standard material. FIG. 5 also indicates an XRD pattern of $Li_2S$ (denoted as "$Li_2S$ after MM" at the top of a graph) which was solely subjected to the mechanical milling treatment.

Figure 6:
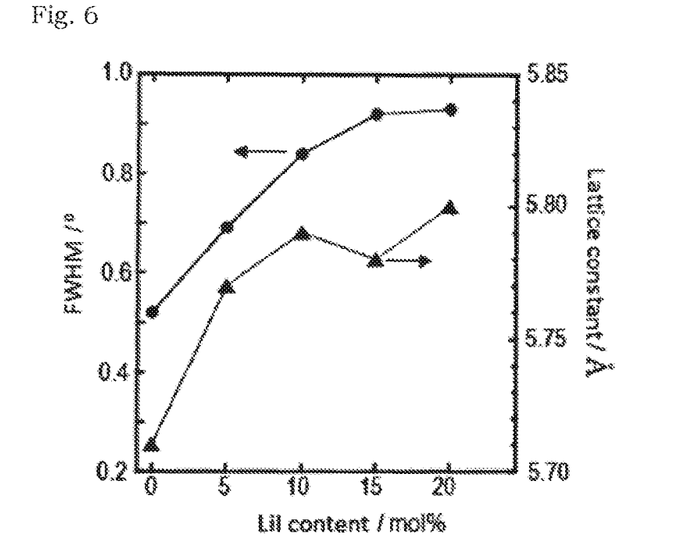
FIG. 6 indicates a graph indicating a relation between a half-value width of the positive electrode of Example 2 and an content in the positive electrode, and a relation between a lattice constant of the positive electrode and the LiI content in the positive electrode.

It is found from FIG. 5 that $Li_2S.LiI$'s do not exhibit any LiI-derived peaks, except for a composition of $75Li_2S.25LiI$, but exhibit $Li_2S$-derived peaks only. FIG. 6 indicates full width at half maximum (FWHM) and lattice constants of peaks of a (111) surface of $Li_2S$ in the XRD patterns of $Li_2S.LiI$. FIG. 6 indicates that the full width at half maximum and in the lattice constants are increased with an increase in content of LiI, and it is inferred from FIG. 6 that LiI was also taken into the crystallized $Li_2S$ and became a solid solution therein.

Figure 7:
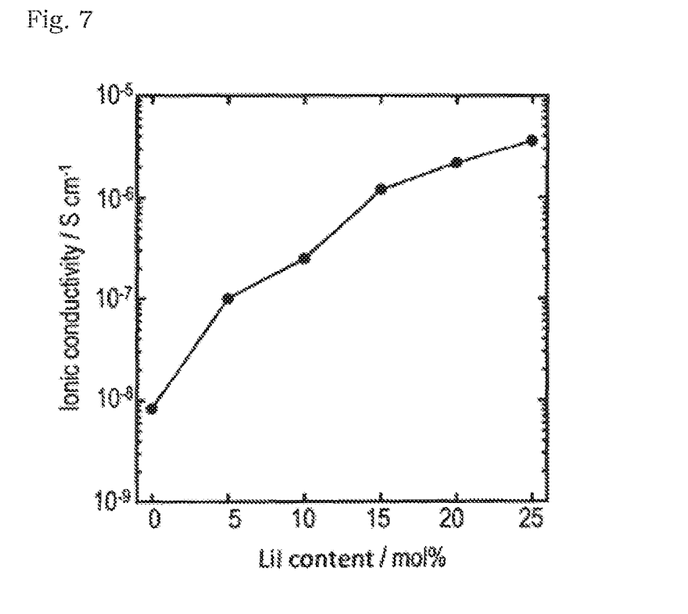
FIG. 7 indicates a graph indicating a relation between a conductivity of the positive electrode of Example 2 and the LiI content in the positive electrode.

FIG. 7 indicates conductivities of $Li_2S.LiI$'s. FIG. 7 also indicates conductivity of $Li_2S$ itself. $Li_2S$ itself is extremely low in conductivity and thereby cannot sufficiently transfer lithium ions. It is thus expected that $Li_2S$ and LiI combined may achieve both improvement in the conductivity and assuredness in the charge-discharge capacity.

Figure 8:
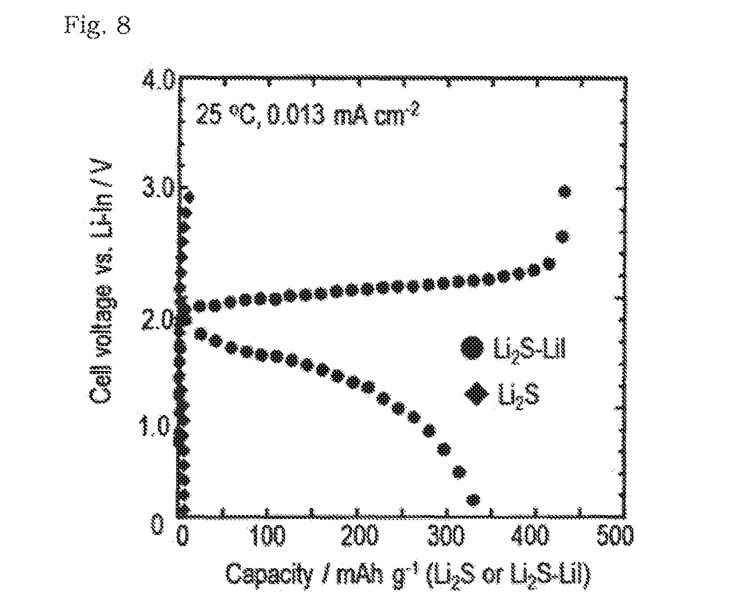
FIG. 8 indicates a graph indicating a relation between a cell potential and a charge-discharge capacity of a secondary battery of Example 2.

Next, an all-solid lithium secondary battery was obtained in the same manner as in Example 1, except that 0.21 g of $80Li_2S.20LiI$ and 0.09 g of acetylene black (manufactured by Denka Company Limited and hereinafter referred to as AB) were subjected to mechanical milling treatment in order to obtain a positive electrode, which was to be used in the secondary battery; and FIG. 8 indicates a relation between a cell potential and a charge-discharge capacity of the secondary battery, in the case where the obtained secondary battery was subjected to one charge-discharge cycle at 25° C. and at a current density of 0.013 mA/cm². It is found from FIG. 8 that a reversible capacity of over about 340 mAhg$^{-1}$ is obtained. On the other hand, an all-solid lithium secondary battery having a positive electrode containing $Li_2S$ and AB resulted in difficulty in charge and discharge. The former all-solid lithium secondary battery is thus capable of charge and discharge without adding any electrolyte to the positive electrode because $Li_2S.LiI$ is high in ionic conductivity.

Example 3

Figure 9:
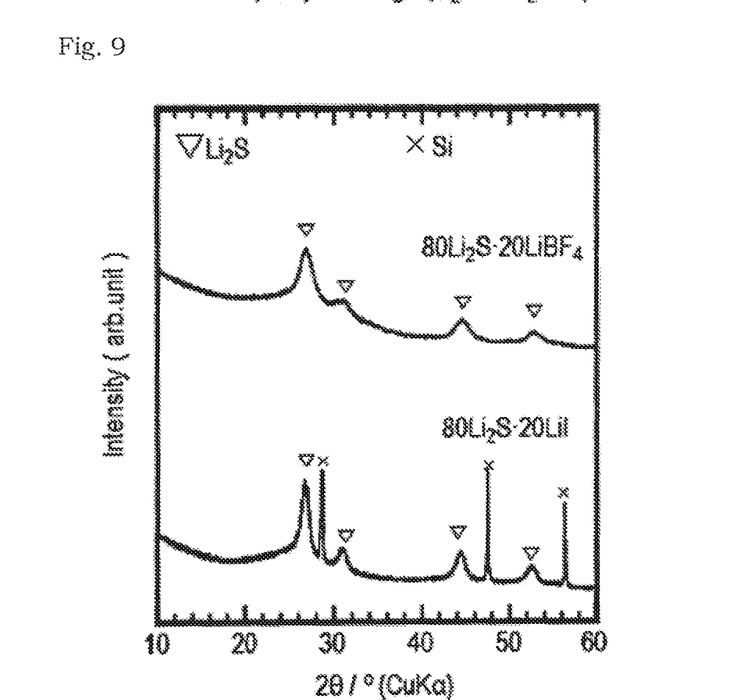
FIG. 9 indicates XRD patterns of a positive electrode of Example 3.
Figure 10:
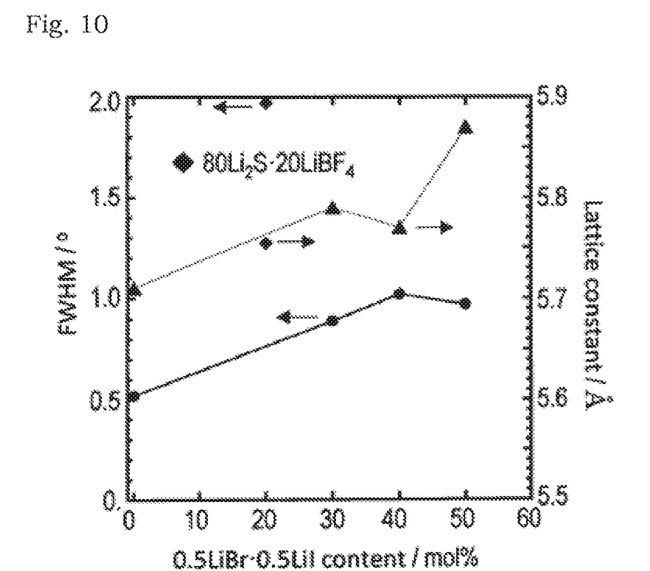
FIG. 10 indicates a graph indicating a half-value width and a lattice constant of the positive electrode of Example 3.

$80Li_2S.20LiNO_3$ and $80Li_2S.20LiBF_4$ were obtained in the same manner as in Example 1, except that $LiNO_3$ was used to obtain $80Li_2S.20LiNO_3$ and that $LiBF_4$ was used to obtain $80Li_2S.20LiBF_4$, instead of using LiBr.LiI. FIG. 9 indicates an XRD pattern of the obtained $80Li_2S.20LiBF_4$ together with an XRD pattern of $80Li_2S.20LiI$. In FIG. 9, a symbol ∇ indicates peaks corresponding to $Li_2S$, and a symbol × indicates peaks corresponding to Si, which was added as an internal standard material. It is found from FIG. 9 that $80Li_2S.20LiBF_4$ does not exhibit any $LiBF_4$-derived peaks and that the peaks corresponding to $Li_2S$ in $80Li_2S.20LiBF_4$ are wider than the peaks corresponding to $Li_2S$ in $80Li_2S.20LiI$. FIG. 10 indicates full width at half maximum (FWHM) and lattice constants of peaks of a (111) surface of $Li_2S$ in the XRD pattern of $80Li_2S.20LiBF_4$. FIG. 10 also indicates the full width at half maximum and the lattice constants of $Li_2S.(0.5LiBr.0.5LiI)$'s indicated in FIG. 2. It is found from FIG. 10 that $80Li_2S.20LiBF_4$ is approximately the same in lattice constants as $Li_2S.(0.5LiBr.0.5LiI)$'s, but is considerably wider in full width at half maximum than $Li_2S.(0.5LiBr.0.5LiI)$'s. It is inferred from this that $LiBF_4$ was present as a solid solution in $Li_2S$ while $LiBF_4$ widened lattices of $Li_2S$ crystals.

Figure 11:
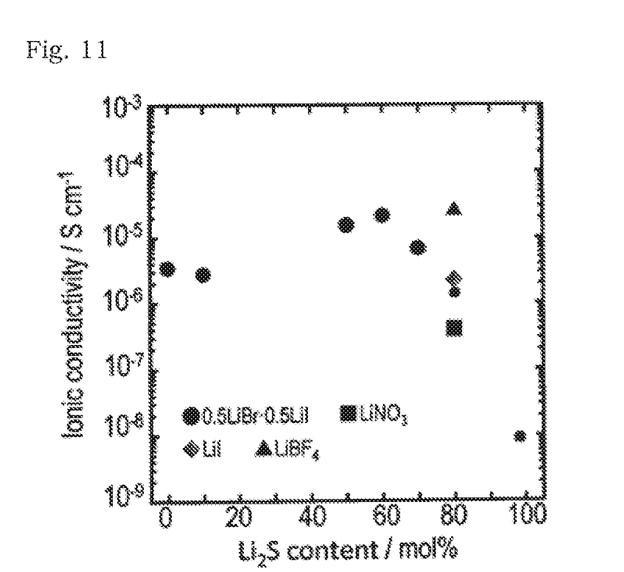
FIG. 11 indicates a graph indicating a conductivity of the positive electrode of Example 3.

FIG. 11 indicates conductivities of $80Li_2S.20LiNO_3$ and of $80Li_2S.20LiBF_4$. FIG. 11 also indicates conductivities of $Li_2S.(0.5LiBr.0.5LiI)$'s and of $80Li_2S.20LiI$, both of which have the various molar ratios indicated in FIG. 3. It is found from FIG. 11 that $80Li_2S.20LiNO_3$ exhibits the conductivity to the same extent as $80Li_2S.20(0.5LiBr.0.5LiI)$ and that $80Li_2S.20LiBF_4$ exhibits the higher conductivity than $80Li_2S.20(0.5LiBr.0.5LiI)$.

Example 4

Figure 12:
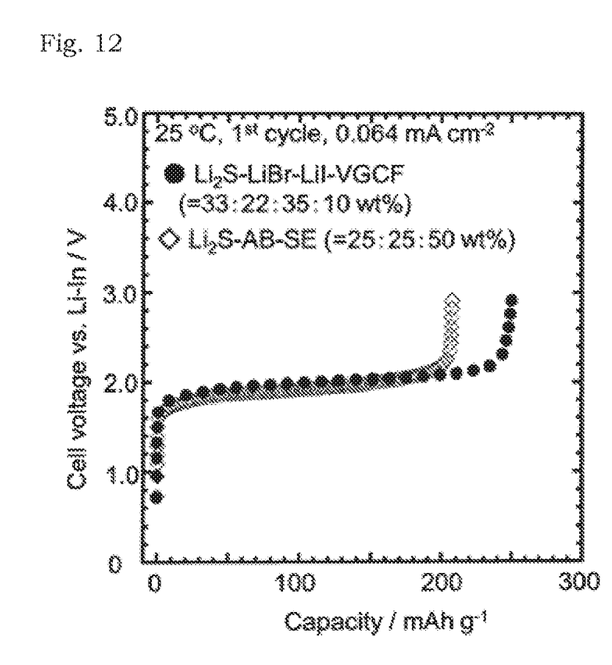
FIG. 12 indicates a graph indicating a relation between a cell potential and a charge capacity of a secondary battery of Example 4.

$Li_2S$, AB, and SE, which was obtained in the same manner as in Example 1, ($Li_2S$:AB:SE=25:25:50 (ratio by weight)) were subjected to mechanical milling treatment. Used as a treatment instrument was the same as the one used for manufacturing the above-described SE; an amount of a sample poured into the treatment instrument was 1 g; a pot and balls, both made of zirconium oxide, were used; and the one hundred (100) balls were used in the 45-milliliter pot, each of the balls having a diameter of 5 mm. The treatment was carried out at room temperature (about 25° C.) and at a rotation speed of 370 rpm for 2 hours. The treated product was used as a positive electrode to obtain an all-solid lithium secondary battery in the same manner as in Example 1. FIG. 12 indicates a relation between a cell potential and a charge capacity of the obtained secondary battery, in the case where the secondary battery was subjected to one charge-discharge cycle at 25° C. and at a current density of 0.064 mA/cm². FIG. 12 also indicates a relation between the cell potential and the charge capacity per positive electrode gross weight of the secondary battery of Example 1. It is found from FIG. 12 that the SE-free secondary battery of Example 1 is higher in charge capacity per positive electrode gross weight than the SE-containing secondary battery.

Example 5

$Na_2S$ (manufactured by Nagao & Co., Ltd. and having a purity of 99% or higher) and NaI (manufactured by Sigma- Aldrich Co. LCC and having a purity of 99.999%) were weighed to be 0.3 g in total at a molar ratio of 75:25. The weighed material was subjected to mechanical milling treatment under the same conditions as in Example 1, and 75Na$_2$S.25NaI was obtained.

Figure 13:
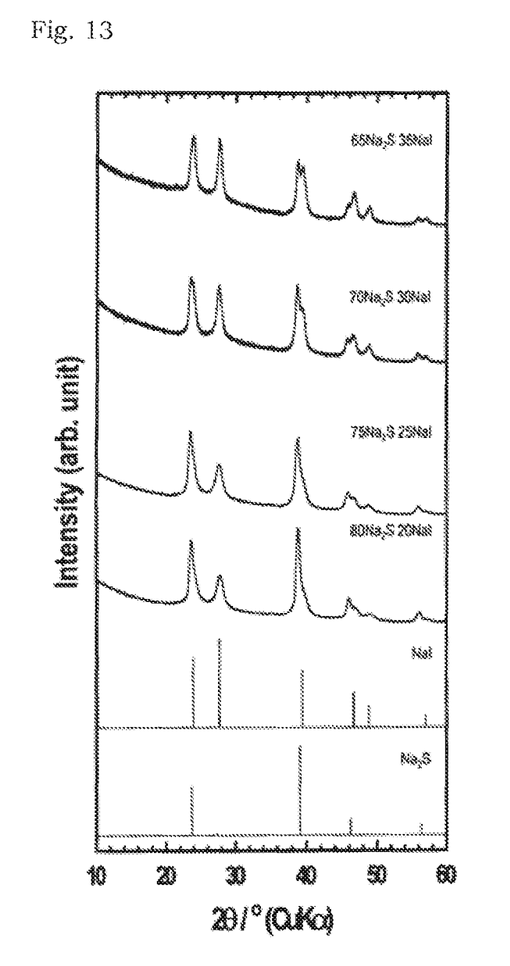
FIG. 13 indicates XRD patterns of a positive electrode of Example 5.

10 mg of the obtained 75Na$_2$S.25NaI was pressed (pressure of 360 MPa) to obtain a pellet, the pellet having a diameter of 10 mm and a thickness of about 0.05 mm. FIG. 13 indicates an XRD pattern of 75Na$_2$S.25NaI. FIG. 13 indicates at its lower part an XRD pattern of Na$_2$S and an XRD pattern of NaI. As seen in FIG. 13, Na$_2$S.NaI mainly exhibited Na$_2$S-derived peaks and partly exhibited NaI-derived wide peaks. 75Na$_2$S.25NaI was measured for a conductivity at room temperature, resulting in 1×10$^{-7}$ S cm$^{-1}$; and it was found that this resulting conductivity is about four (4) orders of magnitude higher than a conductivity (2.3×10$^{-11}$ S cm$^{-1}$) of Na$_2$S itself. It is thus expected that Na$_2$S and NaI combined may achieve both improvement in the conductivity and assuredness in the charge-discharge capacity by being subjected to the mechanical milling treatment.

65Na$_2$S.35NaI, 70Na$_2$S.30NaI, and 80Na$_2$S.20NaI were obtained in the same manner as described above, except that a molar ratio of Na$_2$S and NaI was changed. XRD patterns were measured in the same manner as described above, and results thereby obtained are indicated in FIG. 13.

Next, 0.18 g of 75Na$_2$S.25NaI and 0.02 g of vapor-grown carbon fibers (manufactured by Showa Denko K.K. and hereinafter referred to as VGCF) were subjected to mechanical milling treatment. Used as a treatment instrument was the same as the one described above; a pot and balls, both made of zirconium oxide, were used; and the one hundred sixty (160) balls were used in the 45-milliliter pot, each of the balls having a diameter of 4 mm. The treatment was carried out at room temperature (about 25° C.) and at a rotation speed of 510 rpm for 10 hours.

5 mg of a composite of the treated 75Na$_2$S.25NaI and VGCF was pressed (pressure of 360 MPa) to obtain a pellet (positive electrode), the pellet having a diameter of 10 mm and a thickness of about 0.03 mm.

80 mg of a solid electrolyte containing Na$_2$S.P$_2$S$_5$ (hereinafter referred to as SE and having a molar ratio of 75:25 between Na$_2$S and P$_2$S$_5$) was pressed (pressure of 360 MPa) to obtain a pellet (electrolyte layer), the pellet having a diameter of 10 mm and a thickness of about 0.7 mm. SE described above was synthesized in the following way.

Na$_2$S (manufactured by Nagao & Co., Ltd. and having a purity of 99% or higher) and P$_2$S$_5$ (manufactured by Sigma-Aldrich Co. LCC and having a purity of 99%) were weighed to be 1 g in total at a molar ratio of 75:25, and were poured into a planetary ball mill. After being poured, Na$_2$S and P$_2$S$_5$ were subjected to mechanical milling treatment and then to heat treatment in order to obtain SE. Used as the planetary ball mill was Pulverisette P-7 manufactured by Fritsch GmbH; a pot and balls, both made of zirconium oxide, were used; and the five hundred (500) balls were used in the 45-milliliter pot, each of the balls having a diameter of 4 mm. The dry mechanical milling treatment was carried out at a rotation speed of 510 rpm and at room temperature for 1.5 hours in a dry nitrogen-filled glove box. The treated product was then subjected to heat treatment at 270° C. for 1 hour to obtain SE. This synthesis method is based on the descriptions in the section titled "Experimental" in Akitoshi Hayashi, et al. *Journal of Power Sources*. 258. 2014. 420-423.

Used as a negative electrode was a pellet obtained by pressing 20 mg of Na$_{15}$Sn$_4$ (pressure of 360 MPa), the pellet having a diameter of 10 mm and a thickness of about 0.1 mm.

The above-described positive electrode, electrolyte layer, and negative electrode were layered and interposed between stainless steel current collectors and were pressed (pressure of 360 MPa), and an all-solid sodium secondary battery was obtained.

Figure 14:
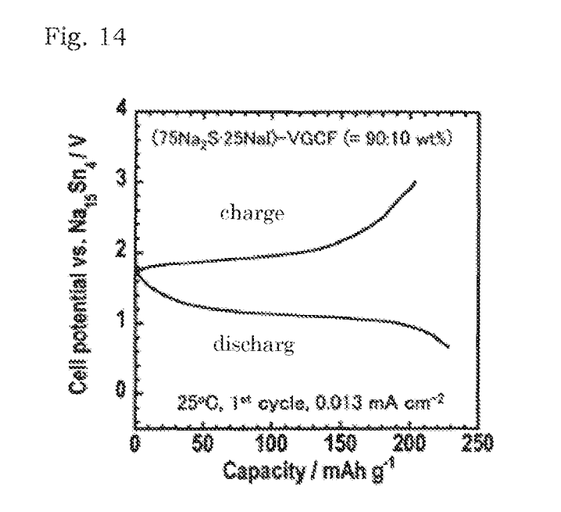
FIG. 14 indicates a graph indicating a relation between a cell potential and a charge-discharge capacity of a secondary battery of Example 5.

FIG. 14 indicates a relation between a cell potential and a charge-discharge capacity of the obtained secondary battery (cell), in a case where the secondary battery was subjected to one charge-discharge cycle at 25° C. and at a current density of 0.013 mA/cm$^2$. In FIG. 14, a vertical axis on the left side of a graph indicates a potential with respect to an Na$_{15}$Sn$_4$ counter electrode. It is found from FIG. 14 that a reversible capacity of over about 200 mAhg$^{-1}$ is obtained.

What is claimed is:

1. A positive electrode for an all-solid secondary battery, comprising a positive electrode active material expressed by A$_2$S.A$_y$X, wherein
   A is an alkali metal;
   X is selected from I, Br, Cl, F, BF$_4$, BH$_4$, SO$_4$, BO$_3$, PO$_4$, O, Se, N, P, As, Sb, PF$_6$, AsF$_6$, ClO$_4$, NO$_3$, CO$_3$, CF$_3$SO$_3$, CF$_3$COO, N(SO$_2$F)$_2$ and N(CF$_3$SO$_2$)$_2$; and
   y is 1, 2, or 3, and
   wherein the A$_2$S and A$_y$X in A$_2$S·A$_y$X have a ratio (molar ratio) of 99:1 to 60:40,
   wherein the positive electrode further comprises an electrical conducting material comprising a carbon material,
   wherein the electrical conducting material is contained within 0.1 to 50 parts by weight with respect to 100 parts by weight of the positive electrode active material; and
   wherein the positive electrode active material is in the form of a solid solution.

2. The positive electrode for an all-solid secondary battery of claim 1, wherein the alkali metal is Li or Na, in the case where A is Li, AX is selected from LiI, LiBr, LiCl, LiF, LiBF$_4$, LiBH$_4$, Li$_2$SO$_4$, Li$_3$BO$_3$, Li$_3$PO$_4$, Li$_2$O, Li$_2$Se, Li$_3$N, Li$_3$P, Li$_3$As, Li$_3$Sb, LiPF$_6$, LiAsF$_6$, LiClO$_4$, LiNO$_3$, Li$_2$CO$_3$, LiCF$_3$SO$_3$, LiCF$_3$COO, LiN(SO$_2$F)$_2$ and LiN(CF$_3$SO$_2$)$_2$; and in the case where A is Na, AX is selected from NaI, NaBr, NaCl, NaF, NaBF$_4$, NaBH$_4$, Na$_2$SO$_4$, Na$_3$BO$_3$, Na$_3$PO$_4$, Na$_2$O, Na$_2$Se, Na$_3$N, Na$_3$P, Na$_3$As, Na$_3$Sb, NaPF$_6$, NaAsF$_6$, NaClO$_4$, NaNO$_3$, Na$_2$CO$_3$, NaCF$_3$SO$_3$, NaCF$_3$COO, NaN(SO$_2$F)$_2$ and NaN(CF$_3$SO$_2$)$_2$.

3. The positive electrode for an all-solid secondary battery of claim 1, wherein the A$_2$S and A$_y$X in A$_2$S.A$_y$X have a ratio (molar ratio) of 80:20 to 60:40.

4. A method for manufacturing positive electrode for the all-solid secondary battery of claim 1, comprising subjecting A$_2$S and A$_y$X to mechanical milling treatment in order to obtain A$_2$S.A$_y$X.

5. The method for manufacturing positive electrode for the all-solid secondary battery of claim 4, wherein the mechanical milling treatment is carried out by using a planetary ball mill under the following conditions: a rotation speed of 50 to 700 rpm, a treating time of 0.1 to 30 hours, and an electric power for the treatment of 1 to 100 kWh/kg (total amount of A$_2$S and AX).

6. The method for manufacturing positive electrode for the all-solid secondary battery of claim 4, wherein the positive electrode contains an electrical conducting material comprising a carbon material, and the positive electrode is obtained by subjecting $A_2S.A_yX$ and the electrical conducting material to the mechanical milling treatment.

7. An all-solid secondary battery comprising the positive electrode of claim 1 and a solid electrolyte layer expressed by $A_2S.M_xS_y$, wherein A is the same as the one described above; M is selected from P, Si, Ge, B, Al and Ga; and x and y are an integer, and x and y indicate a stoichiometric ratio varying depending upon the type of M.

8. An electrode assembly for an all-solid secondary battery, comprising a positive electrode and a current collector, wherein the positive electrode comprises a positive electrode active material expressed by $A_2S.A_yX$, wherein A is an alkali metal;

X is selected from I, Br, Cl, F, $BF_4$, $BH_4$, $SO_4$, $BO_3$, $PO_4$, O, Se, N, P, As, Sb, $PF_6$, $AsF_6$, $ClO_4$, $NO_3$, $CO_3$, $CF_3SO_3$, $CF_3COO$, $N(SO_2F)_2$ and $N(CF_3SO_2)_2$; and y is 1, 2 or 3, and wherein the $A_2S$ and $A_yX$ in $A_2S.A_yX$ have a ratio (molar ratio) of 99:1 to 40:60, wherein the positive electrode further comprises an electrical conducting material comprising a carbon material, wherein the electrical conducting material is contained within 0.1 to 50 parts by weight with respect to 100 parts by weight of the positive electrode active material, wherein the positive electrode is formed on a current collector, and wherein the positive electrode active material is in the form of a solid solution.

9. The electrode assembly of claim 8, wherein the alkali metal is Li or Na, in the case where A is Li, AX is selected from LiI, LiBr, LiCl, LiF, $LiBF_4$, $LiBH_4$, $Li_2SO_4$, $Li_3BO_3$, $Li_3PO_4$, $Li_2O$, $Li_2Se$, $Li_3N$, $Li_3P$, $Li_3As$, $Li_3Sb$, $LiPF_6$, $LiAsF_6$, $LiClO_4$, $LiNO_3$, $Li_2CO_3$, $LiCF_3SO_3$, $LiCF_3COO$, $LiN(SO_2F)_2$ and $LiN(CF_3SO_2)_2$; and in the case where A is Na, AX is selected from NaI, NaBr, NaCl, NaF, $NaBF_4$, $NaBH_4$, $Na_2SO_4$, $Na_3BO_3$, $Na_3PO_4$, $Na_2O$, $Na_2Se$, $Na_3N$, $Na_3P$, $Na_3As$, $Na_3Sb$, $NaPF_6$, $NaAsF_6$, $NaClO_4$, $NaNO_3$, $Na_2CO_3$, $NaCF_3SO_3$, $NaCF_3COO$, $NaN(SO_2F)_2$ and $NaN(CF_3SO_2)_2$.

10. The electrode assembly of claim 8, wherein the $A_2S$ and $A_yX$ in $A_2S.A_yX$ have a ratio (molar ratio) of 80:20 to 60:40.

* * * * *